(12) United States Patent
Szela et al.

(10) Patent No.: US 8,539,659 B2
(45) Date of Patent: Sep. 24, 2013

(54) METHOD OF REPAIRING AN ARTICLE

(75) Inventors: Edward R. Szela, West Springfield, MA (US); Michael A. Joy, Middletown, CT (US); Daniel A. Bales, Avon, CT (US); Bradford A. Cowles, Tolland, CT (US); David A. Rutz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1091 days.

(21) Appl. No.: 12/107,849

(22) Filed: Apr. 23, 2008

(65) Prior Publication Data

US 2009/0269208 A1 Oct. 29, 2009

(51) Int. Cl.
*B23P 6/00* (2006.01)

(52) U.S. Cl.
USPC ............ 29/402.13; 29/402.11; 29/402.09; 29/402.18; 29/402.21; 29/889.1

(58) Field of Classification Search
USPC ........... 29/889, 889.1, 402.1, 402.09, 402.11, 29/402.12, 402.13, 402.14, 402.16, 402.18, 29/402.21
See application file for complete search history.

(56) References Cited

U.S. PATENT DOCUMENTS

| | | | |
|---|---|---|---|
| 2,680,286 A | | 6/1954 | Willgoos |
| 4,156,582 A | * | 5/1979 | Anderson .................. 416/96 R |
| 5,111,570 A | * | 5/1992 | Baumgarten et al. ...... 29/402.13 |
| 5,826,453 A | | 10/1998 | Prevey, III |
| 6,339,878 B1 | | 1/2002 | Owen et al. |
| 6,508,000 B2 | * | 1/2003 | Burke et al. ............... 29/889.1 |
| 6,575,702 B2 | | 6/2003 | Jackson et al. |
| 6,787,740 B2 | | 9/2004 | Smith et al. |
| 6,893,225 B2 | | 5/2005 | Crall |
| 6,926,970 B2 | | 8/2005 | James et al. |
| 7,165,712 B2 | * | 1/2007 | Abdo et al. ................ 228/173.1 |
| 7,810,237 B2 | * | 10/2010 | Lange et al. ............... 29/889.1 |
| 2005/0019491 A1 | * | 1/2005 | Spitsberg et al. .......... 427/248.1 |
| 2005/0091847 A1 | | 5/2005 | Beneteau et al. |
| 2006/0168808 A1 | | 8/2006 | Lin et al. |
| 2007/0084047 A1 | * | 4/2007 | Lange et al. ............... 29/889.1 |
| 2007/0157447 A1 | | 7/2007 | Prevey |
| 2007/0186416 A1 | * | 8/2007 | Birkner et al. ............. 29/889.1 |
| 2007/0234772 A1 | | 10/2007 | Prevey, III |

FOREIGN PATENT DOCUMENTS

| | | |
|---|---|---|
| EP | 1138431 | 10/2001 |
| EP | 1253289 | 10/2002 |
| EP | 1527845 | 5/2005 |
| EP | 1734225 | 12/2006 |
| GB | 897137 | 5/1962 |
| GB | 1269598 | 4/1972 |
| GB | 2048146 A | 12/1980 |
| WO | WO2007/081924 A2 | 7/2007 |

OTHER PUBLICATIONS

Technical Brief from the Journal of Turbomachinary; Advanced Turbofan Blade Refurbishment Technique, 666 / vol. 117 Oct. 1995.

(Continued)

*Primary Examiner* — Sarang Afzali

(74) *Attorney, Agent, or Firm* — Carlson, Gaskey & Olds, P.C.

(57) ABSTRACT

A method of repairing an article includes removing an undesirable section of the article, attaching a repair section to the article at a location from which the undesirable section has been removed, and mechanically working the repair section to achieve a reduction in a cross-sectional area of the repair section.

24 Claims, 4 Drawing Sheets

(56) References Cited

OTHER PUBLICATIONS

Aircraft Maintenance Technology, Airfoil Technologies International (ATI), 1999.
Aircraft Maintenance Technology Article found on services page of www.amtonline.com.publication.
Cao X et al.: "Effect of pre and post-weld heat treatment on metallurgical and tensile properties of Inconel 718 alloy butt joints welded using 4 kW Nd: YAG laser" Journal of Materials Science, Kluwer Academic Publishers, BO, vol. 44, No. 17, Jul. 2, 2009. pp. 4557-4571, XP019730772, ISSN: 1573-4803.
Prevey Paul S. et al.: "FOD resistance and fatigue crack arrest in low plasticity burnished IN718" 5th National Turbine Engine High Cycle Fatigue Conference, Chandler, AZ, Mar. 9, 2000, XP008120520.

* cited by examiner

METHOD OF REPAIRING AN ARTICLE

BACKGROUND OF THE INVENTION

This disclosure relates to a repair method and a repaired article. More particularly, the disclosure relates to a repair method for providing a repaired article having properties that are substantially equal to or better than properties of the original article.

In many instances, there is a desire to repair an article rather than replace the article with a new article. For instance, airfoils used as blades or vanes in a gas turbine engine are relatively expensive. Due to the expense, repairing the airfoils may be more cost efficient than replacing the airfoils with new airfoils.

The erosion, wear, or corrosion may gradually change the original design geometry of the airfoil and degrade the aerodynamic efficiency of the airfoil. To repair the airfoil, the eroded, worn, or corroded section may be removed and replaced with a repair section to restore the aerodynamic efficiency. The repair section may be welded onto the airfoil and then machined to attain the original design geometry. Although effective, one potential drawback is that the heat from welding may negatively influence the mechanical properties of the repair section and airfoil. For instance, heat-affected regions of the repair section and airfoil may include undesirable microstructural phases that contribute to lower than desired mechanical properties.

Therefore, there is a continuing need for new repair processes that provide repaired articles having properties that are substantially equal to or better than the original properties of the article.

SUMMARY OF THE INVENTION

The disclosed repair method and repaired article are for providing the repaired article with physical properties that are substantially equal to or better than the physical properties of the original article.

In one example, a method of repairing the article includes at least partially removing an undesirable section of the article, attaching a repair section to the article at a location from which the undesirable section has been removed, and mechanically working the repair section to thereby achieve a reduction in a cross-sectional area of the repair section.

In another aspect, a method of repairing the article includes at least partially removing an undesirable section of the article, welding a repair section to the article at a location from which the undesirable section has been removed, and mechanically cold working the repair section to thereby achieve a 10%-50% reduction in a cross-sectional area of the repair section.

The disclosed examples may be used to repair an article. For example, a repaired article may include a body extending between a first side and a second side, where the body includes a repair section having an associated thickness between the first side and the second side. The repair section includes regions of plastic deformation distributed entirely through the thickness. For example, the plastic deformation contributes to restoring fatigue strength.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
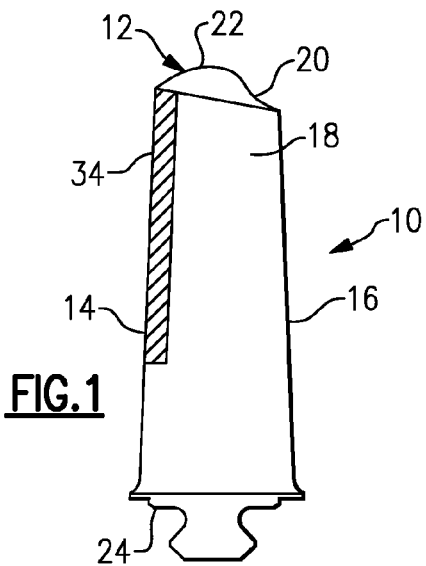
FIG. 1 illustrates an example article for repair.

FIG. 1 illustrates selected portions of an example article 10 that is to be repaired. In this example, the article 10 is illustrated as a rotatable airfoil blade that may be used within a gas turbine engine. However, it is to be understood that the article 10 may alternatively be a relatively static airfoil vane. For example, airfoil blades and vanes are commonly used in a compressor and turbine sections of the engine. Alternatively, the article 10 may be any other type of article and is not limited to the disclosed examples.

The article 10 may be fabricated from any suitable type of metallic alloy, such as a nickel-based alloy. The nickel-based alloy may include about 50-55 wt % nickel, about 17-21 wt % chromium, about 0.65-1.15 wt % titanium, about 0.2-0.8 wt % aluminum, about 4.75-5.5 wt % columbium, about 0-1 wt % cobalt, about 2.8-3.3 wt % molybdenum, and a balance of iron. In some examples, the nickel-based alloy includes only the above elements. In other examples, the nickel-based alloy may include impurities that do not affect the properties of the alloy or impurities that are unmeasured or undetectable in the alloy.

The example article 10 includes an airfoil 12 having a leading edge 14, a trailing edge 16, a first side 18, and a second side 20. For example, the first side 18 and the second side 20 may correspond to a pressure side and a suction side when used within a gas turbine engine. The airfoil 12 also extends between a tip 22 and a base platform 24 that is used to mount the article 10 within an engine. As can be appreciated, the design of the illustrated blade may vary, and the illustrated design is not intended to be a limitation on this disclosure.

The article 10 has been subjected to a period of use within a gas turbine engine, for example. As a result, the article 10 has developed an undesirable section 34. For example, the undesirable section 34 may be an eroded section, worn section, corroded section, or other type of section exhibiting blemishes from use of the article 10. In examples where the article 10 is not an engine component, there may be other causes of the undesirable section 34 that are related to the particular use of the article 10.

The undesirable section 34 in this example is located at the leading edge 14 of the article 10. However, in other examples, the undesirable section 34 may be located at the trailing edge 16, tip 22, base platform 24, or other portions of the article 10.

Figure 2:
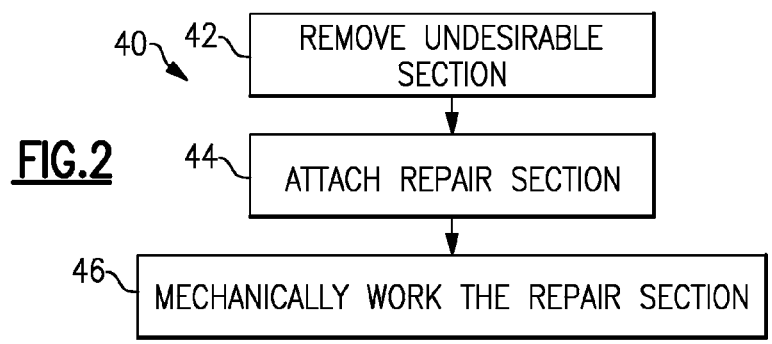
FIG. 2 illustrates an example method for repairing the article.

FIG. 2 illustrates an example method 40 for repairing the undesirable section 34 of the article 10. For instance, it may be desirable to repair the undesirable section 34 to restore an aerodynamic efficiency of the article 10. As can be appreciated, there may also be other reasons for the desirability of repairing the article 10.

The example method 40 generally includes a removal step 42, an attaching step 44, and a mechanical working step 46. The disclosed method 40 may be used alone or in combination with additional steps to repair the article 10, such as precipitation heat treating, planishing, or other mechanical working steps. In the removal step 42, the undesirable section 34 is at least partially removed from the article 10. For instance, the undesirable section 34 may be machined to either completely or partially remove the undesirable section 34. The attaching step 44 includes attaching a repair section to the article 10. Finally, the mechanical working step 46 includes mechanically working the repair section to reduce a cross-sectional area of the repair section.

Figure 3:
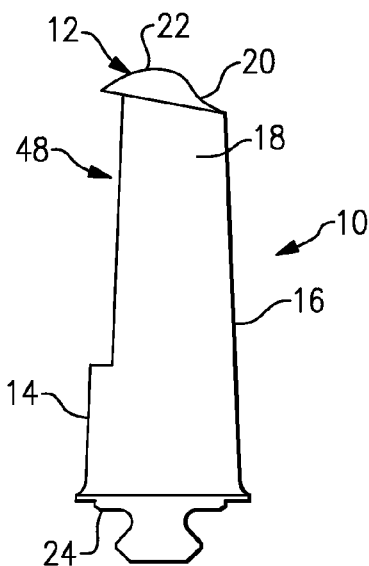
FIG. 3 illustrates an example implementation of a removal step of a repair method.
Figure 4:
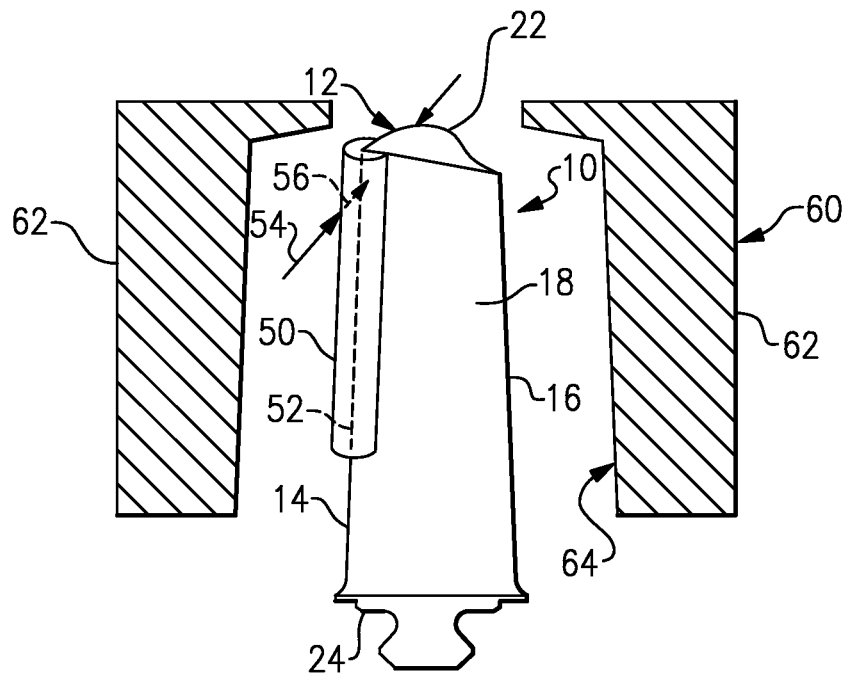
FIG. 4 illustrates an example implementation of an attaching step and a mechanical working step of a repair method.
Figure 5:
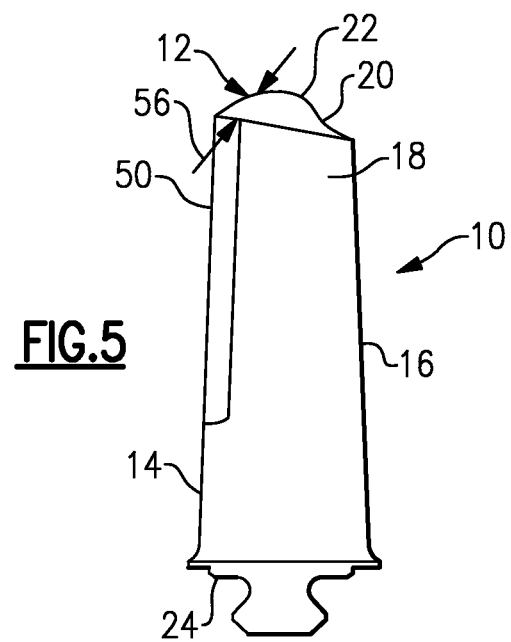
FIG. 5 illustrates an example of the article after being repaired.

FIGS. 3-5 illustrate an example application of the method 40 to repair the article 10. For instance, FIG. 3 illustrates the article 10 after the undesirable section 34 has been removed. The undesirable section 34 may be removed using any suitable technique, such as cutting, grinding, blasting, and chemical etching. Upon removal, there is a void 48 in the location from which the undesirable section 34 was removed.

Referring to FIG. 4, a repair section 50 is then attached to the article 10 in the location of the void 48. The repair section 50 may nominally have the same composition as the alloy of the article 10. In one example, the repair section includes about 50-55 wt % nickel, about 17-21 wt % chromium, about 0.65-1.15 wt % titanium, about 0.2-0.8 wt % aluminum, about 4.75-5.5 wt % columbium, about 0-1 wt % cobalt, about 2.8-3.3 wt % molybdenum, and a balance of iron.

The repair section 50 may be attached to the article 10 using any suitable technique. For example, the repair section 50 may be attached using a welding technique. In this regard, the repair section 50 may also be considered as a welded repair section. In some examples, the welding technique is gas tungsten arc welding, laser powder weld deposition, plasma arc welding, micro-metal inert gas welding, or other type of welding technique. Additionally, the repair section 50 may be formed in any suitable manner. For example, the repair section 50 may be pre-fabricated and then attached to the article 10, or the repair section 50 may be formed by depositing a powder, wire, or other welding material on the article 10.

As can be appreciated, the repair section 50 in this example is larger in size than the original geometry of the article 10. The original geometry is represented by dashed line 52. For instance, the repair section 50 initially includes an associated cross-sectional area 54 extending between the first side 18 and the second side 20. The cross-sectional area 54 is larger than cross-sectional area 56 of the original geometry of the article 10. In some examples, the repair section 50 may be machined down to the cross-sectional area 54 after attaching the repair section 50, in preparation for the mechanical working step 46.

The article 10 may then be placed into a die 60 to conduct the mechanical working step 46. In this example, the mechanical working step includes forging the article 10 at a relatively cold temperature (e.g., room temperature); however, it is to be understood that the mechanical working step 46 may include other types of mechanical working operations, such as planishing or other metalworking operations.

The die 60 includes a pair of die halves 62 that define a cavity 64 that is contoured to the shape of the original article 10. The cavity 64 may enclose the entire article 10 (airfoil 12 and base platform 24), only the airfoil 12, only the repair section 50, or the repair section with some overlap of the airfoil 12 (e.g., to facilitate fixturing). The die halves 62 compress and plastically deform the repair section 50 to reduce the cross-sectional area 54 down to no less than the cross-sectional area 56 of the original geometry of the article 10. The die halves 62 are then opened, and the article 10 is removed. Any flash material from the repair section 50 may then be trimmed, leaving the article 10 and repair section 50 having a geometry that is substantially equal to the original geometry as illustrated in FIG. 5.

Figure 6:
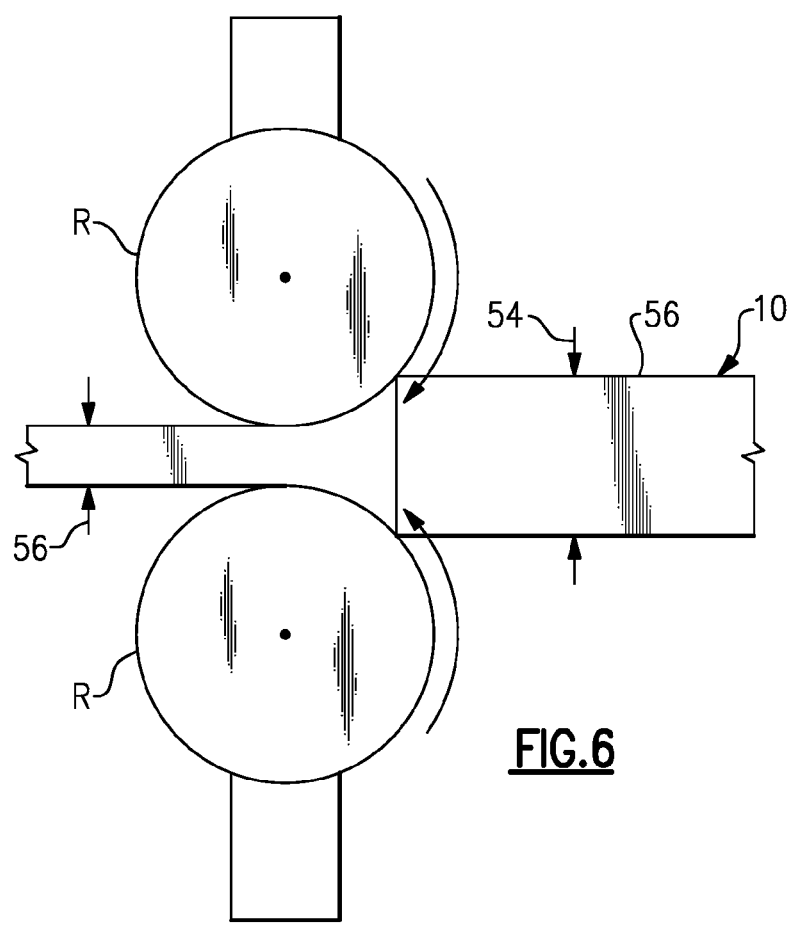
FIG. 6 illustrates an example mechanical working step that includes roll planishing.
Figure 7:
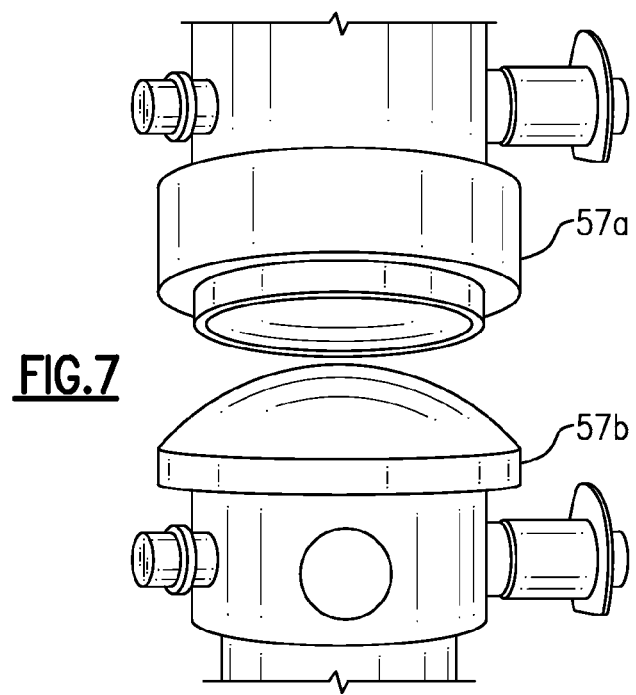
FIG. 7 illustrates an example mechanical working step that includes hammer planishing.

As an alternative to forging, or in addition to forging, the mechanical working step 46 may include planishing. As illustrated in FIG. 6, the planishing may be roll planishing where the repair section 50 is rolled between rollers R to reduce the cross-sectional area 54 down to no less than the cross-sectional area 56 of the original geometry of the article 10. As illustrated in FIG. 7, the planishing may be hammer planishing where the repair section 50 is hammered between a reciprocating hammer 57a and a planish stake 57b to reduce the cross-sectional area 54 down to no less than the cross-sectional area 56 of the original geometry of the article 10. The planishing may be conducted manually or using an automated or semi-automated planishing machine.

Mechanically working the repair section 50 causes plastic deformation entirely through the cross-sectional area 56 of the repair section 50. For instance, the mechanical working causes dislocations within the microstructure of the alloy used to form the article 10. The dislocations contribute to improving the physical properties of the repair section 50, such as increasing ultimate tensile strength, fatigue strength, and hardness. For example, the properties of the repair section 50 are substantially equal to or better than the properties of the original article 10 because of the dislocations.

The degree of mechanical working that is used may also be varied, depending upon the desired properties of the repair section 50. For instance, a greater degree of mechanical working may be used to achieve a relatively greater degree of fatigue strength, or a relatively lower amount of mechanical working may be used to achieve a desired lower fatigue strength. In some examples, the mechanical working reduces the cross-sectional area 54 to the cross-sectional area 56 by 10%-50%. In a further example, the reduction is about 30%.

The plastic deformation of the repair section 50 is distributed entirely through the cross-sectional area 56 of the repair section 50. For instance, the distribution and degree of plastic deformation may be determined using scanning electron microscope electron back-scatter imaging. Such a technique is generally known in the art and need not be detailed in this disclosure.

Figure 8:
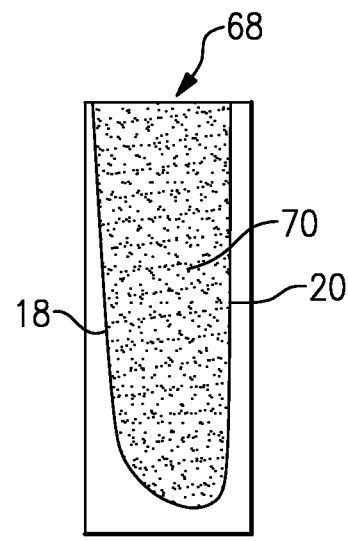
FIG. 8 schematically illustrates an image of a repair section having regions of plastic deformation.

FIG. 8 illustrates an example schematic image 68 using scanning electron microscope electron back-scatter diffraction patterns (Orientation Imaging Microscopy). In this example, the image 68 is a cross-section of the repair section 50 extending between the first side 18 and the second side 20 of the article 10. Plastic deformation is represented by regions 70 (shown as specks). As can be appreciated from the image 68, the regions 70 are distributed entirely through the cross-section between the sides 18 and 20. Plastic deformation distributed entirely through the thickness provides the entire repair section 50 with improved physical properties.

Figure 9:
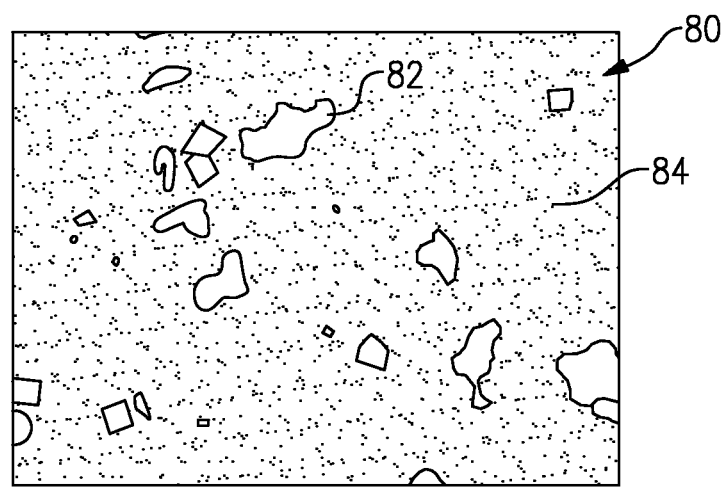
FIG. 9 illustrates an example microstructure that is substantially free of a delta phase.

Referring to FIG. 9, the method 40 may also be used to achieve a desirable microstructure 80. For example, the microstructure 80 includes regions of Laves phase 82 distributed within a matrix 84 of the alloy composition. In this example, the microstructure 80 is substantially free from, and in some examples entirely free of, orthorhombic delta phase regions of Ni$_3$Cb, which is a needle-shaped phase that is known to degrade physical properties (e.g., fatigue strength). For instance, the disclosed method 40 may be used to avoid a solution heat treating step that typically results in the formation of the delta phase. In some repair processes, an article having a repair section may be heat treated at 1750° F. or higher to homogenously solutionize elements within the alloy, and then be aged at approximately 1150-1350° F. (621-732° C.) to precipitation strengthen the alloy. The heat treating typically contributes to the formation of the delta phase. However, using the disclosed method 40, the solution heat treating step can be eliminated because the plastic deformation and dislocations from the mechanical working contribute to improving fatigue strength and thereby lessen the need for heat treating. Therefore, at least the heat treating step may be eliminated, although it still may be desirable to utilize the aging process to achieve a degree of precipitation strengthening.

The method 40 may also be used in combination with additional steps to further restore the original geometry and/or performance of the article 10. For instance, various mechanical finishing steps may be used to restore the article 10. The article 10 may be peened, coated, vibratory finished, or otherwise processed.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of repairing an article, comprising:
removing an undesirable section of an article comprised of a metallic alloy;
attaching a repair section to the article at a location from which the undesirable section has been removed, wherein the repair section is formed by depositing a powder on the article; and
mechanically working the repair section subsequent to the attaching step to thereby achieve a reduction in a cross-sectional area of the repair section by 10%-50%, wherein mechanically working the repair section includes plastically deforming the repair section entirely through a repair section, wherein the repair section is substantially free from orthorhombic delta phase regions of Ni$_3$Cb.

2. The method of claim 1, wherein the repair section has at least one physical property substantially equal to or better than a non-repaired section of the article.

3. The method of claim 2, wherein the at least one physical property is a tensile strength.

4. The method of claim 2, wherein the at least one physical property is a fatigue strength.

5. The method of claim 2, wherein the at least one physical property is a hardness.

6. The method as recited in claim 1, wherein mechanically working the repair section includes forging the repair section in a die.

7. The method as recited in claim 6, wherein the die defines a cavity that covers only the repair section and a portion of the article during mechanical working of the article.

8. The method as recited in claim 1, further comprising restoring an original geometry of the repair section subsequent to mechanically working the repair section.

9. The method of claim 8, wherein restoring the original geometry of the repair section includes peening the repair section.

10. The method as recited in claim 1, comprising mechanically working the repair section at a temperature below a heat treatment temperature of the metallic alloy.

11. The method as recited in claim 10, further comprising aging the article at an elevated temperature, after mechanically working the article, to precipitation-strengthen the article.

12. The method as recited in claim 1, comprising reducing the cross-sectional area by 30%.

13. The method as recited in claim 1, wherein mechanically working the repair section includes roll planishing the repair section between rollers.

14. The method as recited in claim 1, wherein mechanically working the repair section includes hammer planishing the repair section.

15. The method as recited in claim 1, wherein attaching the repair section to the article includes welding the repair section to the article.

16. The method as recited in claim 1, wherein at least a portion of the article includes an airfoil having a leading edge and a trailing edge, and the repair section is located at the leading edge of the airfoil.

17. The method as recited in claim 1, wherein the repair section is entirely free from orthorhombic delta phase regions of Ni$_3$Cb.

18. The method as recited in claim 1, wherein the reduction in cross sectional area is a reduction in axial cross sectional area and radial cross sectional area.

19. The method of claim 1, wherein the repair section is attached such that the repair section at least partially contacts the article.

20. The method of claim 1, wherein the repair section is rigidly attached.

21. A method of repairing an article, comprising:
removing an undesirable section of an article comprised of a metallic alloy;
welding a repair section to the article at a location from which the undesirable section has been removed, wherein the repair section is formed by depositing a powder on the article; and
mechanically cold working the repair section subsequent to the welding step at a temperature below a heat treating temperature of the metallic alloy to reduce a cross-sectional area of the repair section by 10%-50%, wherein the repair section is substantially free from orthorhombic delta phase regions of Ni$_3$Cb.

22. The method as recited in claim 21, further comprising forming the repair section from an alloy comprising about 50-55 wt % nickel, about 17-21 wt % chromium, about 0.65-1.15 wt % titanium, about 0.2-0.8 wt % aluminum, about 4.75-5.5 wt % columbium, about 0-1 wt % cobalt, about 2.8-3.3 wt % molybdenum, and a balance of iron.

23. The method as recited in claim 22, wherein the repair section includes about 50-55 wt % nickel, about 17-21 wt % chromium, about 0.65-1.15 wt % titanium, about 0.2-0.8 wt % aluminum, about 4.75-5.5 wt % columbium, about 1 wt % cobalt, about 2.8-3.3 wt % molybdenum, and a balance of iron.

24. The method as recited in claim 21, further comprising machining the repair section before mechanically cold working the repair section to achieve a desired shape of the repair section.

\* \* \* \* \*